United States Patent [19]

Wyland

[11] 4,020,358
[45] Apr. 26, 1977

[54] DEVICE SYSTEM AND METHOD FOR CONTROLLING THE SUPPLY OF POWER TO AN ELECTRICAL LOAD
[75] Inventor: Alvin D. Wyland, Morrison, Ill.
[73] Assignee: General Electric Company, Fort Wayne, Ind.
[22] Filed: Dec. 16, 1975
[21] Appl. No.: 641,331
[52] U.S. Cl. .............................. 307/39; 236/46 R; 307/117; 307/141
[51] Int. Cl.[2] ..................................... G05D 23/00
[58] Field of Search ............... 307/39, 141, 141.4, 307/141.8, 140, 38, 34, 35, 62, 117, 41; 236/46 R; 235/151.21, 92 T, 92 MT

[56] References Cited
UNITED STATES PATENTS

| | | | |
|---|---|---|---|
| 2,266,252 | 12/1941 | Osterheld | 219/39 |
| 2,385,525 | 9/1945 | McLoy | 62/4 |
| 2,679,602 | 5/1954 | Gallagher | 307/39 |
| 3,261,992 | 7/1966 | Coe | 307/117 |
| 3,527,445 | 9/1970 | Stewart et al. | 263/15 |
| 3,636,369 | 1/1972 | Harter | 307/141.4 |
| 3,737,671 | 5/1973 | Davis | 307/126 |
| 3,925,680 | 12/1975 | Dixon | 307/140 |
| 3,979,601 | 9/1976 | Franklin | 307/141 |

Primary Examiner—James R. Scott
Assistant Examiner—Morris Ginsburg
Attorney, Agent, or Firm—Joseph E. Papin

[57] ABSTRACT

A device for controlling the supply of power to an electrical load. The device has means for timing through selected cyclical time periods and means for actuating the timing means upon the occurrence of a certain condition. Means is provided for establishing another certain condition generally during a part of each cyclical time period, and means is also provided for inhibiting the supply of power to the load upon the occurrence of both the first named and other certain conditions.

Other devices, systems and methods for controlling or proportioning the supply of power to an electrical load are also disclosed along with a method of statistically staggering power consumption by a plurality of loads and a power distribution network for supplying power to a plurality of loads.

36 Claims, 5 Drawing Figures

DEVICE SYSTEM AND METHOD FOR CONTROLLING THE SUPPLY OF POWER TO AN ELECTRICAL LOAD

BACKGROUND OF THE INVENTION

This invention relates in general to electrical controls and in particular to devices, systems and methods for controlling or proportioning the supply of power to a load, a method of statistically staggering power consumption by a plurality of loads, and a power distribution network utilizing such devices so as to statistically stagger power consumption by a plurality of loads.

One of the problems confronting electrical utility companies is the peaking-type demands placed on their power generating equipment during some summer months by the wide spread usage of air conditioning apparatus particularly on rather hot days and also during some winter months by the usage of various heating apparatus. In order to accommodate the peaking-type demands, electrical utility companies would ordinarily be forced into rather large expenditures for additional power generating capacity and equipment, but of course, such expenditures appear unattractive since such peaking-type demands presently may occur on an infrequent basis, i.e., generally only between about fifteen to thirty days a year.

In the past, various devices were utilized in different systems and different methods were employed to predeterminately limit the peaking-type demands on the power generating capacity of the electrical utility companies; however, one of the disadvantageous or undesirable features of at least some of such prior art devices is believed to be that they were generally much too complex both in design and operation so as to incur the resultant disadvantageous or undesirable feature of being generally too expensive for wide spread commercial usage in a power distribution system or network.

In some of the other prior art devices, electromechanical components were employed generally having at least some of the known disadvantageous or undesirable features which may be attendent to such components. Others of the prior art devices and systems utilize a radio-type signal emanated from the utility company to disconnect their power customers' loads from the power line; however, at least one of the disadvantageous or undesirable features of this particular prior art device and system is believed to be that the customers' loads may be disconnected for an inordinately long period of time at the whim of the utility company causing inconvenience and/or uncomfortable conditions for such customers. Also such radio actuated prior art devices and systems possibly could be undesirably actuated by a spurious signal. In still some others of the prior art devices and systems, a ripple signal is emanated from the utility company through their power network lines to disconnect their power customers' loads from the power line; however, at least one of the disadvantageous or undesirable features of this particular ripple signal device and system is believed to be that only certain segments of the power network may be taken off the line effecting inconvenience and/or uncomfortable conditions to the power customer in such certain segment while other power customers' loads may be unaffected.

In another one of the prior art devices, the theory of its operation is generally based upon preconceived or predicted periods during which peaking-type demands were known to occur in the past. A photocell device is responsive generally to the first light of day for actuating a timer which, in effects, sets the prior art device to be operative only during the predicted period of peaking-type demands for taking the regulated load off the line. This prior art device is also provided with an atmospheric temperature sensing mechanism which is operable generally to take the load off the line if the sensed atmospheric temperature exceeds a selected value when such prior art device is set to operate during the predicted period. The load thereafter is off the line until the sensed atmospheric temperature falls below the selected value thereof and/or until the time of the predicted period of the peaking-type demand passes for that particular day.

SUMMARY OF THE INVENTION

Among the several objects of the present invention may be noted the provision of a device, system and method for controlling or proportioning the supply of power to a load, a method of statistically staggering power consumption by a plurality of loads, and a power distribution network utilizing such devices for staggering such power consumptions which overcome the disadvantageous or undesirable features discussed above, as well as others, with respect to the prior art devices and systems; the provision of such device, system, methods and network in which the control or proportioning of the supply of power by such device is independent of its total cycle time; the provision of such device, system, methods and network having no moving parts except possibly components of the load being regulated; the provision of such devices, systems, methods and network in which the total cycle time may be easily and simply varied; the provision of such devices, systems, methods and network in which percent "off" time and the percent "on" time for the load regulated may be easily and simply varied; and the provision of such device, system, methods characterized by simplistic design, ease of assembling components therefor, and economy of manufacture and use. These as well as other objects and advantageous features of the present invention will be in part apparent and in part pointed out hereinafter.

In general, a device in one form of the invention is provided for controlling the supply of power to an electrical load. This device has means for timing through selected cyclical time periods and means for actuating the timing means upon the occurrence of a certain condition. Means is responsive to the actuation of the timing means for establishing another certain condition generally during a part of each cyclical time period, and means is also provided for inhibiting the supply of power to the load upon the occurrence of both the first named and other certain conditions.

Also in general and in one form of the invention, a device for controlling the supply of power to an electrical load has timing means operable generally upon actuation for providing timing signals of a predetermined repetition rate, condition responsive means is provided for actuating the timing means so long as a preselected ambient condition exists. Counter means counts the timing signal repetitions and provides an output signal upon reaching a predetermined count, and gate means is responsive to the joint occurrence of the output signal from the counter means and the continued existence of the certain condition for inhibiting the supply of power to the load.

Further in general and in one form of the invention, a device for controlling the supply of power to an electrical load includes means for monitoring an ambient condition, means for counting through a predetermined counting range when the monitored condition meets a selected criteria therefor, and means for inhibiting the supply of power to the load so long as the count is within at least a selected part of the predetermined counting range.

In general and in one form of the invention, a system is provided for controlling the supply of power from a source thereof to an electrical load. The system has means for connection in circuit relation with the load and adapted to be coupled with the power source including: means for monitoring an ambient condition, means for counting through a predetermined counting range when the monitored condition attains a selected criteria therefor, and means coupled with the load for controlling the supply of power thereto from the power source and operable generally to interrupt the power supply when the count of the counting means is within a selected part of the predetermined counting range.

Also in general, a system in one form of the invention is provided for controlling the supply of power from a source thereof to an electrical load, and the system includes the load and circuit means adapted to be energized from the power source. The circuit means has timing means operable generally for providing repetitive timing signals and condition responsive means for actuating said timing means upon the occurrence of a preselected ambient condition. Counter means for counting the timing signals is also operable generally in the circuit means to establish an output signal upon reaching a predetermined count, and means is coupled in circuit relation with the load and operable generally for inhibiting the supply of power thereto from the source upon the joint occurrence of the output signal and the certain condition.

Further in general and in one form of the invention, there is provided in a power distribution network for supplying power to a plurality of loads, a plurality of power proportioning devices for statistically staggering the supply of power to the loads, respectively, so long as certain conditions exist. Each of the devices has timing means operable upon actuation for providing timing signals of a predetermined repetition rate, and means is responsive to the occurrence of one of the certain conditions for actuating said timing means. Means for counting the timing signals is operable generally to establish an output signal comprising another of the certain conditions upon reaching a predetermined count, and means is responsive to the joint occurrence of the one certain condition and the other certain condition for inhibiting the supply of power to the load. The repetition rates of the timing means for at least some of the devices are generally dissimilar so as to statistically stagger both the initial energization and the duty cycles of the respective loads.

There is also provided in general and in one form of the invention, a method of proportioning the supply of power to a load. This proportioning method includes the steps of monitoring an ambient condition; initiating a timed cyclical count so long as the monitored condition meets certain criteria; and inhibiting the supply of energy to the load so long as the count falls within at least a part of a predetermined range of the timed cyclical count.

Also in general, a method in one form of the invention is provided for statistically staggering power consumption by a plurality of loads. This method includes counting modulo $n$ for at least some of the loads at counting rates which differ from one another, and disabling given ones of the loads when its corresponding count exceeds a preselected number individual to the given ones of the loads which number is less than $n$.

Further in general and in one form of the invention, a method of proportioning the supply of power to a load is provided with the steps of monitoring an ambient condition; timing through selected cyclical time periods when the monitored condition attains certain criteria; establishing an electrical signal during a selected part of each cyclical time period; and inhibiting the supply of power to the load upon the establishment of the electrical signal when the criteria for the monitored condition is attained.

Again in general and in one form of the invention, a system is provided for controlling the supply of power from a power source to an electrical load device connected in circuit therewith and adapted for altering the temperature of a selected space. The system has condition responsive means operable generally in response to the temperature of the selected space for respectively interrupting and completing the circuit so as to control energization of the load device and maintain the temperature of the selected space generally at a preselected value. Controlling means is coupled with the condition responsive means and the load device and is operable generally upon the occurrence of a preselected condition for inhibiting the supply of power for at least a preselected period of time from the power source to the load device when the condition responsive means is operable generally to complete the circuit between the power source and the load device. Means is provided for maintaining a limited supply of power from the power source to at least a part of the controlling means when the condition responsive means is operable generally to interrupt the circuit between the power source and the load device.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention.

DETAILED DESCRIPTION OF THE PREFERRED EMBODIMENT

Figure 1:
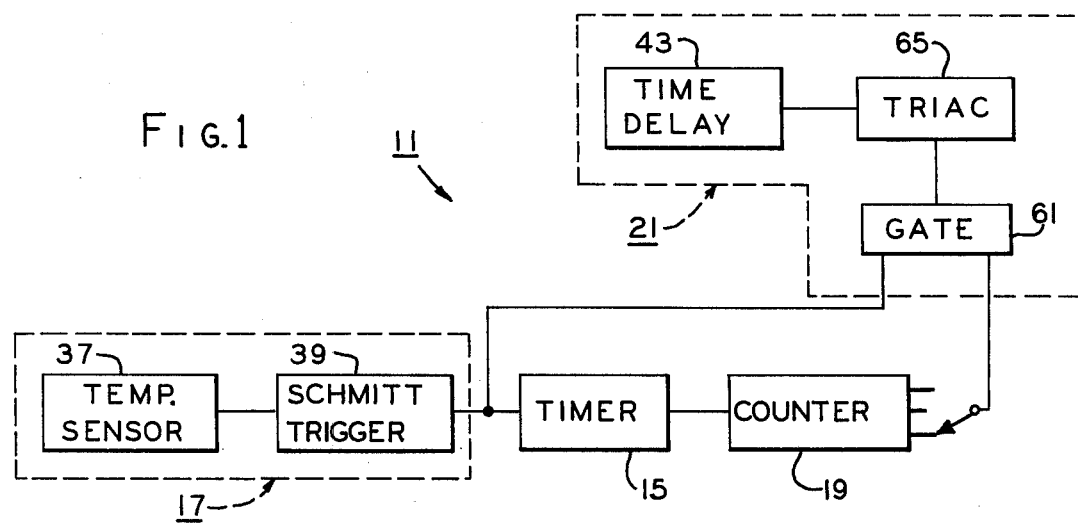
FIG. 1 is a functional block diagram of a device in one form of the invention for controlling the supply of power to a load.
Figure 2:
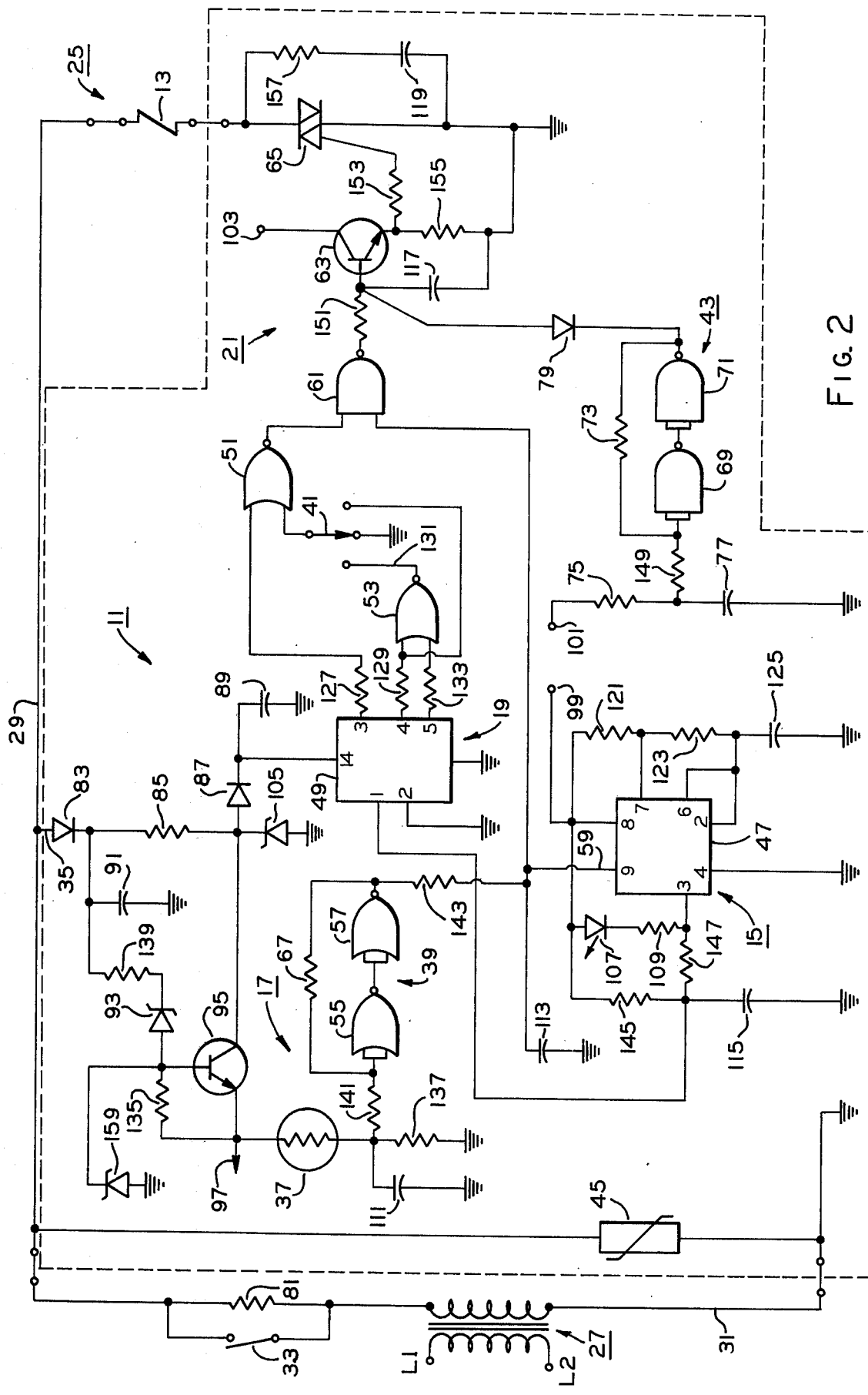
FIG. 2 is a detailed schematic circuit or diagram of the device of FIG. 1 shown connected in a system or circuit in one form of the invention for controlling the supply of power to a load and illustrating principles which may be practiced in a method for controlling the supply of power to a load in one form of the invention.

Referring now to the drawings in general, there is shown in one form of the invention a device 11 for controlling or proportioning the supply of power to an electrical load or load device 13 which is illustrated for purposes of disclosure as a contactor, load relay or the like operable generally to effect the coupling and uncoupling of a load apparatus (not shown) across a power source defined by power or line terminals L1, L2 (FIG. 2). Device 11 is provided with timing means or timer 15 operable generally upon actuation or energization for providing timing signals or pulses at a predetermined repetition rate which, in effect, define preselected cyclical time periods. Means, such as a monitoring or condition responsive means or device indicated generally at 17, is operable generally for actuating timer 15 upon the occurrence of a preselected condition, such as for instance an ambient condition or atmospheric temperature attaining a preselected value or criteria therefor, and for so long as such preselected condition may exist (FIGS. 1 and 2). Means for establishing another preselected condition, such as for instance an output or electrical signal or the like, during a part of each of the aforementioned cyclical time periods may comprise means, such as a counter or counter means indicated generally at 19, for counting the time signal repetitions of timer 15 and for providing the output signal upon reaching a predetermined count. Inhibiting means, indicated generally at 21, is operable for inhibiting the supply of power to load 13 in response to or upon the occurrence of both the above first named and other preselected conditions, i.e., upon the joint occurrence the output signal of counter means 19 and the attainment of the above-mentioned preselected value of the atmospheric temperature as may be sensed by actuating or condition responsive means 17.

Figure 3:
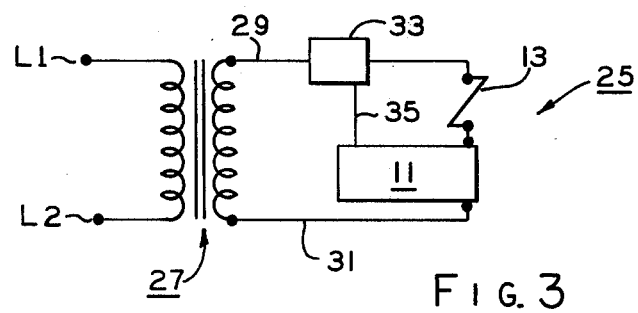
FIG. 3 is a schematic diagram of a system in one form of the invention and incorporating therein the device of FIG. 1.

There is also shown in one form of the invention a system 25 for controlling or proportioning the supply of power from source L1, L2 to load 13 (FIGS. 2 and 3). In this system, the circuit means of device 11 is connected in circuit relation with load 13 and adapted to be coupled with power source L1, L2, and such circuit means includes: means, such as condition responsive means 17, for monitoring a condition or the atmospheric temperature; means, such as counter means 19, for counting through a predetermined counting range when the monitored condition attains the preselected criteria therefor; and means, such as inhibiting means 21, coupled with said load so as to control the supply of power thereto from power source L1, L2 and operable generally for interrupting the power supply when the count of counting or counter means 19 is within a selected part of the predetermined counting range thereof.

More particularly and with specific reference to FIGS. 2 and 3, system 25 has a step down type transformer 27 of a type well known to the art, and the primary side of the transformer is connected across power source L1, L2 while the secondary side of the transformer is connected with supply and return lines 29, 31 of the system. Another condition responsive device, such as an indoor thermostat 33 or the like of any type well known to the art, is connected with supply line 29 between the secondary side of transformer 27 and load 13, and the indoor thermostat is disposed in a manner well known to the art to sense the temperature of air in the space adapted to be conditioned by the load apparatus, such as an air conditioner for instance (not shown). Device 11 is connected in return line 31 between the secondary side of transformer 27 and load 13, and a control lead 35 is connected between device 11 and indoor thermostat 33. In this manner, device 11 is connected in system 25 generally in parallel circuit relation across indoor thermostat 33 and load 13. While the aforementioned load apparatus is disclosed and discussed herein as an air conditioner, it is contemplated that heating apparatus may also be controlled by device 11 within the scope of the invention so as to meet the objects and advantageous features thereof.

Referring now to FIGS. 1 and 2, the actuating means or condition responsive means 17, comprises a sensor or thermostatic device, such as a temperature sensitive impedance or negative temperature coefficient temperature sensing resistor 37 or the like, and a Schmitt trigger 39 connected in circuit relation. The atmospheric temperature or condition sensed or monitored by sensor 37 is, of course, without the aforementioned space conditioned by the load apparatus (not shown), and when the preselected value of the atmospheric temperature is attained, the sensor causes Schmitt trigger 39 to change its state thereby to effect the actuation of timer 15 so long as the preselected value of the atmospheric temperature exists. Counter 19 cyclically counts the timing signal repetitions of timer 15 and provides the output signal upon reaching a count which is predetermined by the selective position of a percentage determining switch 41. Inhibiting means 21 is responsive to the joint occurrence of an output signal from counter 19 and the continued existence of the preselected value of the atmospheric temperature represented by the output of Schmitt trigger 39 for inhibiting the supply of power to load 13. An initial time delay device 43 which operates independent of the atmospheric temperature may be provided to insure initial inhibition when system 25 is energized, for example, to relieve starting load on power source L1, L2 after a power outage. Five to ten seconds of initial inhibition regardless of the status or count of counter 19 would be typical. Timer 15 may be implemented as a simple oscillator, a bistable multivibrator or other device for providing timing signals at a repetition rate compatible with counter 19. The time interval during which the power supplied to load 13 will be inhibited is inversely proportional to the repetition rate of timer 15, which rate may, of course, be predetermined as desired and, as will be discussed hereinafter in conjunction with FIG. 5, may be made slightly different for different ones of devices 11 to statistically stagger several loads 13 on power source L1, L2.

While the actual time intervals of energization and deenergization of load 13 will be determined by the repetition rate of timer 15, the duty cycle, i.e., the ratio of time that the load is energized with respect to total time, will be independent of this repetition rate and determined solely by counter 19 in conjunction with the particular position of percentage determining switch 41. Counter 19 is a cyclical counting device which repetitively increments for each repetition of a timing signal from timer 15 between an initial count, such as 0, to a maximum count, such as $n-1$, and thereafter the counter returns on its next increment to the initial count. The aforementioned predetermined count is selected by percentage determining switch 41 and may be coincidental with the initial and maximum counts or may occur therebetween. If counter 19 counts modulo $n$, i.e., begins with an initial count of 0 and counts to a maximum value of $n-1$ whereupon the next increment of the counter brings it back to 0 so as to remove the power inhibition of load 13, and the predetermined count is $k$, then the duty cycle for load 13 will be $k/n$ and is independent of the particular timer repetition rate. In general, if power inhibition begins at a count $j$ and ends at a count of $k$, the duty cycle of load 13 would be $$\frac{n-k+j}{n}$$

where $0 \leq j < k \leq n$.

Turning now to the circuit means of device 11 as shown in system 25 of FIG. 2, load 13 is controlled in the normal manner by indoor thermostat 33 when device 11 is not operating in its proportioning mode. In normal operation, indoor thermostat 33 would close enabling load 13 until such time as the atmospheric temperature attained its preselected value, such as 90° F. for instance, whereupon timing means 15 would be actuated by way of Schmitt trigger 39 to begin the controlling time proportioning function of device 11.

Considering the details of the schematic diagram of FIG. 2, standard household voltage may be applied to the primary side of transformer 27 to yield, for example, a 24 volt alternating current at the secondary side of the transformer. A metal oxide varistor 45 may be included for circuit means protection purposes as a transient suppressor. Integrated circuit timing device 47 is a semiconductor integrated circuit oscillator, for example, a Signetics type SE 555 which constitutes the basic frequency generator which supplies pulses or timing signals to counter 19 built about an integrated circuit counter 49 which is, for example, an RCA type CD 4024 AE. Integrated circuit 49 has multiple output pins so that various combinations of counting may be provided, and, of course, the voltage level at a specific pin changes when the counter reaches the count associated with that pin. This voltage level change or output signal may be a "high" (1) or "low" (0) depending on the particular digital devices employed. Switch 41 is illustrated in a 50% position corresponding to a duty cycle for device 11 of ½. When switch 41 connects a NOR gate 51 to the output of another NOR gate 53, a duty cycle of ⅝ of a 37.5% off time for device 11 is provided. The other position for switch 27 corresponds to a duty cycle of ¾ for device 11. Variations in the oscillating frequency of the integrated circuit timing device 47 will alter the total cycle time, and switch 41 establishes the percent off or duty cycle for device 11.

Sensor 37 controls a pair of concatenated NOR gates 55, 57 which together function as the circuit for Schmitt trigger 39. NOR gates 55, 57, like all other NOR gates depicted in FIG. 2, may be RCA type 1/2 CD 4001 AE gates. Frequently, a number of such gates are available on a single integrated circuit ship. The output from NOR gate 57, which is the output of Schmitt trigger 39, is suddenly switched from low to high when the resistance of sensor 37 reaches some threshold value corresponding to the preselected value of the atmospheric temperature, for example, 90° F. When the output of Schmitt trigger 39 occurs, integrated circuit 47 is enabled by a signal on line 59 and begins oscillating. An input signal or "high" is also applied to a NAND gate 61 which, like all others depicted in FIG. 2, may be an RCA type 1/4 CD 4001 AE, and when both of its inputs are high, the base drive to a semiconductor device, such as a transistor 63, is removed so as to cause the transistor to become nonconducting. As a result, the gating signal is removed from a solid state switching device 65 (which may, for example, be a full wave gate control switching device, such as a "Triac") so as to render switching device 65 nonconducting and inhibit or eliminate current flow to load 13 thereby to disable it.

When the atmospheric temperature sensed by sensor 37 exceeds its preselected value, i.e., 90° F., the lower input to NAND gate 61 is enabled or high, integrated circuit timing device 47 is enabled, and the upper input to NAND gate 61 will be enabled and disabled according to the output of counter 19 as determined by NOR gates 51, 53 in conjunction with the selected position of switch 41. The joint occurrence of inputs to NAND gate 61 render transistor 63 (which may for example be a type 2N5172) nonconducting to thereby inhibit the flow of current through solid state switch 65. Proportioning by the circuit means of device 11 is initiated when the atmospheric temperature attains its preselected value; however, Schmitt trigger 39 has a certain hysteresis effect, and the proportioning may continue to be effected down to a deactivating or differential temperature of, for example, 83° F. This hysteresis effect is determined by the value of a resistor 67 which, in one preferred embodiment, was 4.7 megohms.

Time delay device 43 may also be implemented as a Schmitt trigger circuit, for example, of two concatenated NAND gates 69, 71 with a feedback resistor 73, and the time delay device prevents the immediate energization of load 13 and may typically effect a 5 to 10 second delay. The purpose of time delay device 43 is to relieve starting load on power source L1, L2 after a power outage, and the actual delay time is determined by the values of a resistor 75 and a capacitor 77 which in one particular embodiment were 1.5 megohms and 10 microfarads, respectively. A diode 79 couples time delay device 43 to transistor 63 to maintain it nonconducting during the initial time delay and prevents the time delay device from later enabling the transistor. Manufacturing tolerances and/or intentionally introduced variations in the values of resistor 75 and capacitor 77 will provide variable time delays for a plurality of devices thereby statistically staggering the start-up of a plurality of loads 13, as will be discussed in greater detail hereinafter with respect to FIG. 5.

The duty cycle of system 25 is fixed by the position of switch 41, and it is desirable to maintain the count of counter 19 constant during interruptions of the supply of power to the circuit means of device 11 which could occur if, for example, the atmospheric temperature attained its preselected value at the same time the temperature of the air conditioned space was sufficiently low to cause indoor thermostat 33 to open. In order to obviate this particular situation when indoor thermostat 33 is open, cooling anticipator resistor 81 provides a trickle current by way of a diode 83, a resistor 85, a diode 87 and a filtering capacitor 89 to counter 19 so that it may "remember" its count.

Most of the remaining circuitry is deenergized when room thermostat 33 opens. For instance, when room thermostat 33 opens, the voltage on a capacitor 91 begins to fall, and when the zener voltage of a zener diode 93 is reached, the base current for a transistor 95 is cut off. At this time, a transistor 95 ceases to conduct so as to deenergize most of system 25. In one preferred embodiment, the zener voltage of zener diode 93 was about 8 volts, and transistor 95 was a type 2N5172. Voltage to a terminal 97 is thus controlled by transistor 95, and this voltage from terminal 97 is supplied to a pair of terminals 99, 101 but not to a terminal 103. The voltage to terminal 103 is derived from the junction of diode 87 and another diode 105 of the zener type having a breakdown voltage of generally about 10 volts. An indicator light in the form of a light emitting diode 107 and a current limiting resistor 109 may be provided if desired. Capacitors 111, 113, 115, 117, 119, as well as capacitors 89, 91, are present in the circuit to function as filters to smooth ripples which may be present from the alternating current source as well as switching transients which might otherwise occur.

A pair of resistors 121, 123 along with a capacitor 125 establish the frequency of integrated circuit timing device 47 which in the preferred embodiment was about 30 seconds per cycle. Thus, integrated circuit counter 49 would be incremented generally about each 30 seconds, and when the count of counter 19 reaches the predetermined value selected by the position of switch 41, the upper input to NAND gate 61 is enabled or high at that time and for all counts thereafter until integrated circuit counter 49 reaches its maximum count. On the next incrementation of integrated circuit counter 49, the count returns to 0, and the upper input to NAND gate 61 is removed. As discussed in greater detail hereinafter, the actual portion of the counting interval during which load 13 is disabled is a matter of choice and "reset" has been chosen as the end of that interval only for convenience of discussion.

Load 13 will be disabled when both inputs to NAND gate 61 are high or logical 1. For this to be true, Schmitt trigger 39 and sensor 37 must be indicating that the atmospheric temperature has attained its preselected value, i.e., 90° F., and NOR gate 51 must have both inputs low at logical 0. When either one or both of the inputs to NOR gate 51 are high, load 13 is enabled; therefore, with switch 41 in the position shown, the input to NOR gate 51 by way of a resistor 127 must be low for one-half the counting cycle and high for the other half thereof so as to effect a duty cycle of one-half. The specific portion of the counting cycle which is low or high is of course arbitrary. Similarly when switch 41 is moved to the right to its ¾ duty cycle position, one or both of the input signals derived by way of resistor 127 and another resistor 129 are high for three-fourths of the time required for counter 19 to complete its counting cycle. With switch 41 moved to its position connecting the output of NOR gate 53 to the input of NOR gate 51, one or both of the signals received from resistor 127 through a line 131 must be high or logical 1 for five-eighths of the cycle of counter 19 to provide a load duty cycle of five-eighths. The signal on line 131 is high only when both input signals to NOR gate 53 by way of resistor 129 and another resistor 133 are low. While only pins or connectors (numbered as 3, 4 and 5) or integrated circuit counter 49 were employed in this illustration, any of a multitude of logical counting combinations may be employed, as desired.

Figure 4:
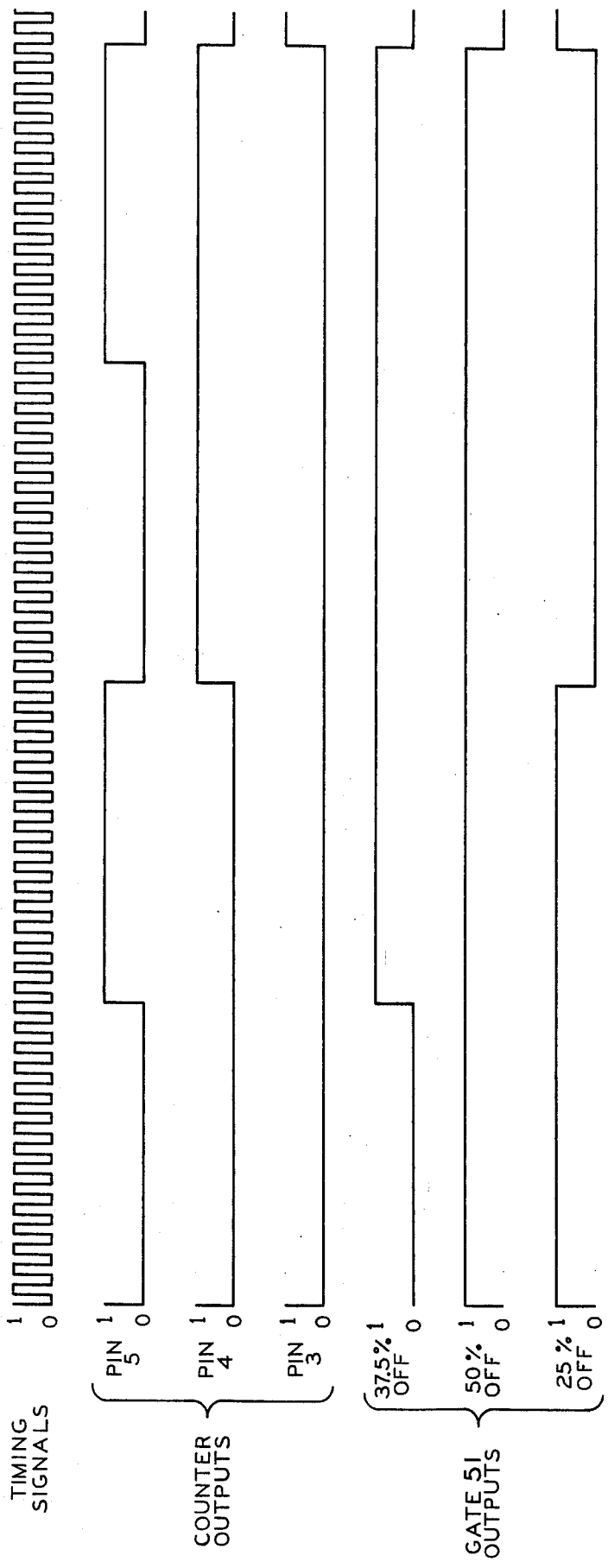
FIG. 4 is a graphical representation depicting wave forms at various points within the circuit of the device of FIG. 1.

The waveforms of FIG. 4 are concerned primarily with the integrated circuit counter 49 and NOR gate 51 of FIG. 2. Since integrated circuit counter 49 is a seven stage binary counter, one half of a complete cycle for that counter is depicted in FIG. 4 with the uppermost waveform representing the timing signals of timer 15 supplied to pin number 1 of the integrated circuit counter. No inhibition can occur during the second half of the counting cycle since pin number 3 provides a logical 1 during that time. Pins number 12, 11, 9 and 6 (not shown) in that order successively provide square wave outputs (not shown) having repetition rates one-half their predecessor in the standard divide-by-two divide-by-2 counter mode of operation. Pins number 5, 4 and 3 continue the divide-by-2 scheme, and these last three pins provide the output signals which are selectively logically combined by NOR gates 51, 53 in the manner determined by the position of switch 41 to achieve the time proportioning of the present invention. In a seven stage binary counter, such as integrated circuit counter 49, 127 pulses are counted before the counter resets to its 0 state, as illustrated in the one complete cycle of that counter in FIG. 4, and of course, the highest order digit, as represented by the output of pin number 3, changes from its 0 to its 1 state once during that cycle. Remembering that load 13 will be inhibited (presuming the existence of the atmospheric temperature in excess of its preselected value as represented by a high level on the lower input to NAND gate 61) at precisely those times when a high output is provided from NOR gate 51, this NOR gate output is depicted for the three positions of switch 41 in the lowermost three waveforms of FIG. 4. For example, with the switch in the position illustrated, NOR gate 51 functions simply as an inverter of the signal from pin number 3, and in this case, the predetermined count at which inhibition of load 13 is initiated happens to be 0. Inhibition of load 13 continues until pin number 3 goes high at which time the output of NOR gate 51 drops to its 0 state allowing the output of NAND gate 61 to again go high causing transistor 63 to conduct and gate Triac 65 to supply the electrical energy to the load.

If switch 41 is moved toward the left where load 13 will be inhibited 37½% of the time for a duty cycle of 0.625, the output of NOR gate 51 goes high on the 16th count and remains high until the 64th count. This is the condition where pin number 3 is a logical 0 and either pin number 4 or pin number 5 or both are a logical 1. With pin numbers 4 or 5 or both at a logical 1, the output of NOR gate 53 is a logical 0.

In the circuit means of device 11, various circuit components which were not discussed above are utilized in a manner well known to the art. These components are: resistors 135, 137 which are biasing resistors; resistors 139, 141, 143 145, 147, 149, 151, 153 and 155 which are coupling resistors; resistor 157 which is a suppression resistor; and a zener diode 159 which is a voltage regulator.

To complete the discussion with respect to the circuit means of device 11, the following list illustrates component values which may be employed for the electronic components of the device.

| Component | Values |
| --- | --- |
| 37 | 3.5K at 90° F. |
| 89, 91 | 100 mfd |
| 77, 111, 117 | 10 mfd |
| 119 | 0.02 mfd |
| 113, 115 | 0.22 mfd |
| 125 | 4.4 mfd |
| 81 | 2–10 K range |
| 139 | 2.2 K |
| 135 | 100 K |
| 85 | 330 ohm, 5W |
| 141 | 330 K |
| 137 | 2.5 K |
| 73, 143, 147, 155 | 10 K |
| 67, 121 | 4.7 m |
| 127, 129, 133 | 470 K |
| 145, 149 | 220 K |
| 109 | 1 K |
| 123 | 5.6 m |
| 75 | 1.5 m |
| 151 | 4.7 K |
| 153 | 470 ohm |
| 157 | 10 ohm |
| 93, 159 | 8 v |
| 105 | 10 v |
| 83 | 200 v, 1 a |
| 79, 87 | 50 v, 0.5 a |
| 45 | 40 v rms |

Referring again to the drawings in general, the foregoing discussion of the circuit means of device 11 and system 25 illustrate principles for practicing a method in one form of the invention for proportioning or controlling the supply of power to load 13. In this proportioning method, a condition, such as the aforementioned atmospheric temperature or other ambient condition for instance, is monitored by sensor 37, and a timed cyclical count of counter 19 is initiated by Schmitt trigger 39 of condition responsive means 17 so long as the monitored condition meets certain criteria, such as the preselected value of the atmospheric temperature (FIGS. 1–4). Further, the supply of power to load 13 is inhibited by inhibiting means 21 so long as the count of counter 19 falls within a predetermined range.

There is also illustrated in one form of the invention another method of proportioning or controlling the supply of power to load 13. This proportioning method includes at least the steps of: monitoring the aforementioned ambient condition or the atmospheric temperature; the timing through selected cyclical time periods by timer 15 when the monitored condition attains certain or preselected criteria, such as the aforementioned preselected value of the atmospheric temperature for instance; establishing an electrical signal by counter 19 during a preselected part of each cyclical time period; and inhibiting the supply of power to load 13, i.e., by gating Triac 65, upon the establishment of the electrical signal when the criteria for the monitored condition is attained.

Figure 5:
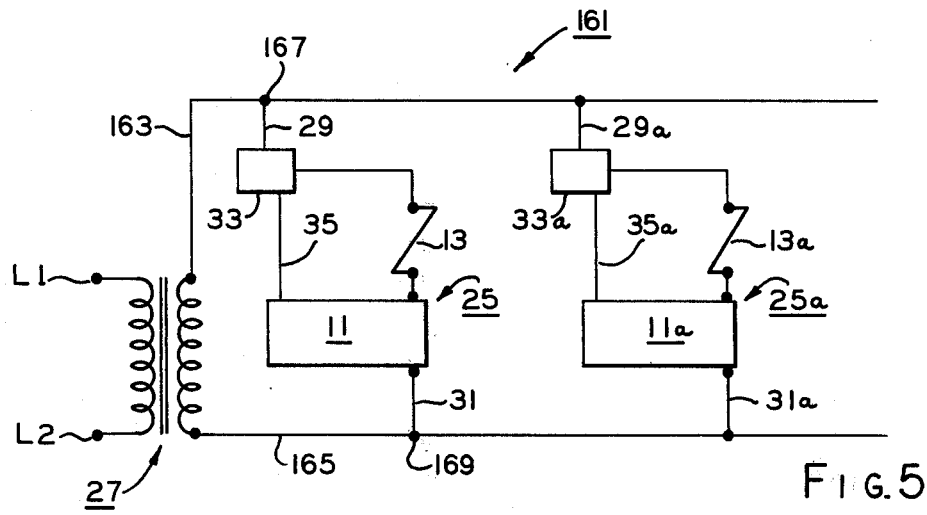
FIG. 5 is a schematic diagram illustrating a power distribution network utilizing the device of FIG. 1 for statistically staggering power consumption by a plurality of loads in one form of the invention and teaching principles which may be practiced in a method for statistically staggering such power consumption also in one form of the invention.

Recapitulating at least in part with respect to the foregoing discussion of system 25 and the circuit means of device 11 and with further reference to the drawings in general, there is disclosed in a power distribution network 161 in one form of the invention for supplying power to a plurality of loads 13, 13a having a plurality of power proportioning or controlling devices 11, 11a for statistically staggering the supply of power to the loads, respectively, so long as a preselected condition exist (FIG. 5). Each of devices 11, 11a (FIGS. 2 and 5) comprise timer 15 operable upon its actuation for providing the timing signals at the predetermined repetition rate, and means, such as condition responsive means 17, responsive to the occurrence of one of the preselected conditions, such as the attainment by the atmospheric temperature of its preselected value, for actuating the timer. Each of devices 11, 11a also have means, such as counter 19, for counting the timing signals emanated from timer 15 and operable generally to establish the output signal comprising another of the preselected conditions upon reaching a predetermined count, and means, such as inhibiting means 21, is responsive to the joint occurrence of the one preselected condition and the other preselected condition for interrupting or inhibiting the supply of power to loads 13, 13a. The repetition rates of timer 15 in respective ones of devices 11, 11a being generally dissimilar so as to statistically stagger both the initial energization and the duty cycles of respective ones of loads 13, 13a.

More particularly and with specific reference to FIG. 5, the primary side of transformer 27 is connected across power source L1, L2 and the secondary side of the transformer is connected across supply line 163 and return line 165 of power distribution network 161. In network 161, system 25 is arranged generally in the same manner as described hereinbefore with respect to FIG. 3 except that lines 29, 31 of system 25 are respectively connected at 167, 169 with distribution lines 163, 165 so as to be across the secondary side of transformer 27. Of course, another system 25a has the same component parts as system 25 and is connected in network 161 in the same manner as discussed above with respect to system 25, and while only the two systems 25, 25a are shown in parallel arrangement in the network, any number of other such systems may also be parallel connected in the network.

Condition responsive proportioners 11, 11a, each of which may be implemented as illustrated in FIG. 2, are employed in systems 25, 25a to statistically stagger the supply of power in network 161 to their respective loads 13, 13a so long as the aforementioned preselected conditions exist. As previously mentioned, loads 13, 13a could be individual or central home air conditioners, and the proportioners or devices 11, 11a may be arranged so that when the atmospheric temperature attains its preselected value, the devices being proportioning the "on" and "off" times through the selected cyclical time periods, as previously discussed. By varying the determined count of counter 19 to effect the "on" time or by varying the repetition rates of the timing signals of timer 15, the "on" time or cycle of the several devices 11, 11a in network 161 could thereby be staggered so that selected ones of loads 13, 13a are placed in circuit across power source L1, L2 at different times so as to be statistically staggered. Therefore, the actual elapsed time per cycle among the several homes may be variable, for example, between plus or minus 20% and under these circumstances, one system 25 in the one-half duty cycle setting of switch 41 might have a 25 minute "on" time followed by a 25 minute "off" time. System 25a with the same one-half duty cycle setting of switch 41 might have a 36 minute "on" time followed by a 36 minute "off" time during which the air conditioner load 13a is inhibited. With a large number of loads and repetition rates for their respective timing means being generally dissimilar, both the initial energization and the duty cycles of those respective loads will be statistically staggered to lower the overall demand on the power distribution system.

Principles for practicing a method in one form of the invention for statistically staggering power consumption by a plurality of loads 13, 13a are taught in the foregoing description of network 161 and its operation. For instance, in this particular method, a modulo $n$ for at least some of the load plurality, such as loads 13, 13a, is counted by counter 19 at counting rates which differ from one another, and given ones of the loads are disabled when their corresponding count exceeds a preselected count individual to the given ones of the loads which count is less than $n$.

From the foregoing it is now apparent that a novel device 11, system 25 and methods for controlling or proportioning supplied power, a novel network 161, and a novel method of statistical staggering load power consumption have been presented meeting the objects, advantages and features set out hereinbefore, as well as others, and it is contemplated that changes as to the precise arrangements, details and connections of the component parts as well as alterations in the method steps may be made by those having ordinary skill in the art without departing from the spirit of the invention or the scope thereof as set out in the claims which follow.

What I claim as new and desire to secure by Letters Patent of the United States is:

1. A device for controlling the supply of power to an electrical load comprising timing means operable generally for establishing timing signals at a predetermined repetitive rate; condition responsive means for effecting the operation of said timing means upon the occurrence of a preselected condition including a temperature sensitive impedance adapted for sensing atmospheric temperature, and a Schmitt trigger circuit responsive to a voltage change across said temperature sensitive impedance for providing an output signal to effect the operation of said timing means when the sensed atmospheric temperature attains a preselected value which constitutes the preselected condition; a counter device including means for counting the timing signals at the predetermined repetitive rate thereof and operable generally to repetitively increment from an initial count to a maximum count in response to the timing signals, means for determining a selected count of said counting means generally between the initial count and the maximum count thereof, and means for providing another output signal upon the occurrence of the selected count of said counting means; gate means having inputs for respectively receiving the first named and other output signals; a semiconductor device coupled with said gate means and adapted to be rendered conductive in response to an output signal from said gate means; and a gate controlled solid state switching means having its gate coupled with said semiconductor device, said switching means being enabled for effecting the supply of power to the load when said semiconductor device is conductive and said switching means being disabled for inhibiting the supply of power to the load when said semiconductor device is non-conductive.

2. A device for controlling the supply of power to an electrical load comprising means for timing through selected cyclical time periods, means for actuating said timing means upon the occurrence of a preselected ambient condition, means responsive to the actuation of said timing means for establishing another preselected condition generally during at least a part of each cyclical time period, and means for inhibiting the supply of power to the load upon the occurrence of both the first named and other preselected conditions.

3. A device as set forth in claim 2 further comprising means coupled with said inhibiting means for delaying the supply of power to the load upon the elimination of at least one of the first named and other preselected conditions.

4. A device as set forth in claim 2 wherein said actuating means includes means for sensing atmospheric temperature, the first named preselected condition comprising the atmospheric temperature attaining a preselected value thereof.

5. A device as set forth in claim 4 wherein said sensing means comprises a temperature sensitive impedance.

6. A device as set forth in claim 2 wherein said actuating means includes means for providing a signal to effect the actuation of said timing means so long as the first named preselected condition exists.

7. A device as set forth in claim 6 wherein said signal providing means comprises a Schmitt trigger circuit.

8. A device as set forth in claim 2 wherein said inhibiting means includes gate controlled solid state switching means operable generally between a conductive state so as to effect the supply of power to the load and a nonconductive state so as to effect the inhibiting of the supply of power to the load, the gate of said switching means being coupled with said actuating means and said establishing means.

9. A device as set forth in claim 2 wherein said establishing means includes means for counting through each cyclical time period of said timing means upon the actuation thereof and operable generally to establish an output signal during the at least part of each cyclical time period, the established output signal comprising the other preselected condition.

10. A device as set forth in claim 2 wherein said establishing means includes a counter operable generally to repetitively increment throughout a predetermined counting range correlated with each cyclical time period of said timing means, the output signal being established at a selected count of said counter between an initial count and a maximum count of the predetermined counting range thereof and continuing thereafter for at least consecutive counts of said counter.

11. A device for controlling the supply of power to an electrical load comprising timing means operable generally upon actuation for providing timing signals of a predetermined repetition rate; condition responsive means for actuating said timing means so long as a preselected ambient condition exists; counter means for counting the timing signal repetitions and for providing an output signal upon reaching a predetermined count; and gate means responsive to the joint occurrence of the output signal from said counter means and the continued existence of the preselected condition for inhibiting the supply of power to the load.

12. A device as set forth in claim 11 wherein said condition responsive means includes means for sensing atmospheric temperature.

13. A device as set forth in claim 12 wherein said condition responsive means further includes means responsive to said sensing means for effecting the actuation of said timing means when the sensed atmospheric temperature attains a selected value which comprises the preselected condition.

14. A device as set forth in claim 11 wherein said counter means includes means adapted for repetitively incrementing between an initial count and a maximum count and returning on the next increment thereof to the initial count in response to the predetermined repetition of the timing signals.

15. A device as set forth in claim 11 further comprising means coupled with said counter means for selectively determining the predetermined count thereof.

16. A device as set forth in claim 11 further comprising means for maintaining the count of said counter means generally constant when said gate means inhibits the supply of power to the load.

17. A device as set forth in claim 11 further comprising means for predeterminately delaying the supply of power to the load subsequent to the operation of said gate means for inhibiting the power supply to the load.

18. A device as set forth in claim 11 wherein said gate means comprises at least a gate controlled solid state switching means operable generally between conductive and nonconductive states and having its gate coupled with said counter means and said condition responsive means, respectively, the gate being disabled upon the elimination of at least one of the output signal and the preselected condition so as to render said switching means nonconductive for effecting the inhibiting of the supply of power to the load.

19. A device as set forth in claim 11 wherein said gate means includes a NAND gate having inputs for receiving the output signal of said counter means and an actuating signal from said condition responsive means, a semiconductor device adapted to be rendered conductive by an output signal from said NAND gate, and a gate controlled solid state switching means having its gate enabled when said semiconductor device conducts thereby to effect the supply of power to the load and disabled when said semiconductor device is nonconducting thereby to effect the inhibiting of the supply of power to the load.

20. A device for controlling the supply of power to an electrical load comprising means for monitoring an ambient condition, means for counting through a predetermined counting range when the monitored condition meets a preselected criteria therefor, and means for inhibiting the supply of power to the load so long as the count of said counting means is within at least a preselected part of the predetermined counting range.

21. A device as set forth in claim 20 wherein said counting means includes means operable generally for incrementing generally between an initial count and a maximum count which comprises the predetermined counting range.

22. A device as set forth in claim 20 further comprising means for predetermining the at least part of the predetermined counting range.

23. A device as set forth in claim 20 further comprising means operable generally for defining a percentage of the predetermined counting range so that such percentage comprises the at least part of the predetermined counting range.

24. A system for controlling the supply of power from a source thereof to an electrical load, the system comprising circuit means for connection in circuit relation with the power source including means for monitoring an ambient condition, means for counting through a predetermined counting range when the monitored condition attains a preselected criteria thereof, and means adapted to be coupled in circuit relation with the load so as to control the supply of power thereto from the power source and operable generally for effectively interrupting the power supply when the count of said counting means is within a selected part of the predetermined counting range thereof.

25. A system for controlling the supply of power from a source thereof to an electrical load, the system comprising circuit means adapted to be energized from the power source including timing means operable generally for providing repetitive timing signals, condition responsive means for actuating said timing means upon the occurrence of a preselected ambient condition, counter means for counting the timing signals and operable generally to establish an output signal upon reaching a predetermined count, and means coupled in circuit relation with the load and operable generally for inhibiting the supply of power thereto from the source upon the joint occurrence of the output signal and preselected condition.

26. A system as set forth in claim 25 wherein said counter means includes means responsive to the timing signals for repetitively incrementing generally between an initial count and a maximum count, the predetermined count being subsequent to the initial count and the output signal continuing from the predetermined count at least for selected consecutive counts thereafter so as to establish a duty cycle for the load.

27. A system as set forth in claim 26 wherein the duty cycle of the load is independent of the rate of the repetitive timing signals of said timing means.

28. A system as set forth in claim 25 wherein the time interval during which the supply of power to the load is inhibited is inversely proportional to the rate of the repetitive timing signals of said timing means.

29. A system as set forth in claim 25 wherein said circuit means further includes means for maintaining the count of said counter means generally constant in the event said circuit means is deenergized.

30. A system as set forth in claim 25 wherein said inhibiting means is also operable generally upon the elimination of at least one of the output signals and the preselected condition to again effect the supply of power from the power source to the load, and wherein said circuit means further includes means for delaying the supply of power to the load at least subsequent to the power supplying effecting operation of said inhibiting means.

31. A system as set forth in claim 25 further comprising other condition responsive means operable generally in response to another preselected condition for controlling the supply of power from the power source to both said circuit means and the load.

32. In a power distribution network for supplying power to a plurality of loads, a plurality of power proportioning devices for statistically staggering the supply of power to the loads, respectively, so long as preselected conditions exist, each of said devices comprising timing means operable upon actuation for providing timing signals of a predetermined repetition rate, means responsive to the occurrence of one of the preselected conditions for actuating said timing means, means for counting the timing signals and operable generally to establish an output signal comprising another of the preselected conditions upon reaching a predetermined count, and means responsive to the joint occurrence of the one preselected condition and the other preselected condition for inhibiting the supply of power to the load, the repetition rates of said timing means for at least some of said devices being generally dissimilar so as to statistically stagger both the initial energization and the duty cycles of the respective loads.

33. A method of proportioning the supply of power to a load comprising the steps of:
 a. monitoring an ambient condition;
 b. initiating a timed cyclical count so long as the monitored condition meets preselected criteria; and
 c. inhibiting the supply of power to the load so long as the count falls within at least a part of predetermined range of the timed cyclical count.

34. A method of statistically staggering power consumption by a plurality of loads comprising the steps of:
 a. counting modulo $n$ for at least some of the loads at counting rates which differ from one another; and
 b. disabling given ones of the loads when its corresponding count exceeds a preselected count individual to the given ones of the loads which number is less than $n$.

35. A method of proportioning the supply of power to a load comprising the steps of:
 a. monitoring an ambient condition;
 b. timing through selected cyclical time periods when the monitored condition attains preselected criteria therefor;
 c. establishing an electrical signal during a selected part of each cyclical time period; and
 d. inhibiting the supply of power to the load upon the establishment of the electrical signal when the preselected criteria for the monitored condition is met.

36. A system for controlling the supply of power from a power source to an electrical load device connected in a circuit therewith and adapted for altering the temperature of a selected space, the system comprising condition responsive means operable generally in response to the temperature of the selected space for respectively interrupting and completing the circuit so as to control energization of the load device and maintain the temperature of the selected space generally at a preselected value; controlling means coupled with said condition responsive means and the load device and operable generally upon the occurrence of a preselected condition for inhibiting the supply of power for at least a preselected period of time from the power source to the load device when said condition responsive means is operable generally to complete the circuit between the power source and the load device; and means for maintaining a limited supply of power from the power source to at least a part of said controlling means when said condition responsive means is operable generally to interrupt the circuit between the power source and the load device.

* * * * *